(12) United States Patent
Li

(10) Patent No.: US 12,026,024 B1
(45) Date of Patent: Jul. 2, 2024

(54) TRAY IN COMPUTER CHASSIS, AND COMPUTER CHASSIS

(71) Applicant: SUZHOU METABRAIN INTELLIGENT TECHNOLOGY CO., LTD., Jiangsu (CN)

(72) Inventor: Hanyi Li, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/689,235

(22) PCT Filed: Jun. 28, 2022

(86) PCT No.: PCT/CN2022/101910
§ 371 (c)(1),
(2) Date: Mar. 5, 2024

(87) PCT Pub. No.: WO2023/050938
PCT Pub. Date: Apr. 6, 2023

(30) Foreign Application Priority Data

Sep. 30, 2021 (CN) .......................... 202111159283.0

(51) Int. Cl.
*G06F 1/18* (2006.01)
(52) U.S. Cl.
CPC .................................... *G06F 1/183* (2013.01)
(58) Field of Classification Search
CPC ....................................................... H05K 5/00
See application file for complete search history.

(56) References Cited

U.S. PATENT DOCUMENTS

| 9,826,658 | B1* | 11/2017 | Mao ........................ G06F 1/183 |
| 2021/0068317 | A1* | 3/2021 | Wang ..................... F16M 13/02 |

FOREIGN PATENT DOCUMENTS

| CN | 2607624 Y | 3/2004 |
| CN | 104460877 A | 3/2015 |
| CN | 107787137 A | 3/2018 |
| CN | 208314685 U | 1/2019 |
| CN | 111417278 A | 7/2020 |
| CN | 112445298 A | 3/2021 |
| CN | 113885667 A | 1/2022 |
| CN | 216772356 U | 6/2022 |
| JP | H10269670 A | 10/1998 |

* cited by examiner

*Primary Examiner* — Jerry Wu
(74) *Attorney, Agent, or Firm* — IPro, PLLC

(57) ABSTRACT

A tray in a chassis and the chassis are provided in the present disclosure. The tray includes a tray housing, a handle assembly and an anti-falling elastic sheet, wherein the handle assembly includes a fixing portion and a handle, the fixing portion is fixedly disposed at a bottom of the tray housing, and the handle and the fixing portion are connected through a rotating shaft; a side wall of the handle is provided with a grip convex column, and the grip convex column is disposed between the rotating shaft and a grip of the handle; and an anti-falling elastic sheet, wherein the anti-falling elastic sheet includes a mounting portion, a convex portion and a connecting portion, the mounting portion is fixedly mounted with the bottom of the tray housing.

18 Claims, 2 Drawing Sheets

TRAY IN COMPUTER CHASSIS, AND COMPUTER CHASSIS

CROSS-REFERENCE TO RELATED APPLICATION

The present disclosure claims the priority of the Chinese patent application filed on Sep. 30, 2021 before the China National Intellectual Property Administration with the application number of 202111159283.0 and the title of "TRAY IN COMPUTER CHASSIS, AND COMPUTER CHASSIS", which is incorporated herein in its entirety by reference.

TECHNICAL FIELD

The present disclosure relates to the field of computer chassis and, more particularly, to a tray in a chassis and the chassis.

BACKGROUND

When there is a pull-out tray in a chassis, a length of the tray usually cannot be predicted by a user before the tray is pulled out. If it is carelessly pulled out too much, the tray may fall and be damaged. Therefore, an anti-falling structure is often disposed for the tray, and when the tray is pulled out to a certain length, this structure may play a role in stopping and preventing from being continuously pulled out by the user. The user needs to press a certain portion of the structure to unlock this stopping device so as to continue pulling out, thus the user is warned to hold the tray well later.

SUMMARY

In a first aspect of an embodiment of the present disclosure, a tray in a chassis is provided, which includes:
  a tray housing;
  a handle assembly, wherein the handle assembly includes a fixing portion and a handle, the fixing portion is fixedly disposed at a bottom of the tray housing, and the handle and the fixing portion are connected through a rotating shaft; a side wall of the handle is provided with a grip convex column, and the grip convex column is disposed between the rotating shaft and a grip of the handle; and
  an anti-falling elastic sheet, wherein the anti-falling elastic sheet includes a mounting portion, a convex portion and a connecting portion, the mounting portion is fixedly mounted with the bottom of the tray housing, the convex portion is protruded to an outside of the bottom of the tray housing through an opening of the tray housing, and the connecting portion is connected to the grip convex column of the handle assembly; wherein when the grip of the handle is rotated from an initial position to a raising position, the grip convex column applies an upward force to the connecting portion to make the anti-falling elastic sheet move upwards.

According to some embodiments of the present disclosure, the mounting portion is disposed at one end of the anti-falling elastic sheet, and the connecting portion is disposed at the other end of the anti-falling elastic sheet opposite to the mounting portion, the mounting portion is fixedly connected to the bottom of the tray housing through a screw, the connecting portion is disposed in a hook shape, and the connecting portion is hooked to the grip convex column.

According to some embodiments of the present disclosure, the fixing portion is disposed as a riveting column, the fixing portion is riveted with the bottom of the tray housing through a rivet, and an upper portion of the fixing portion is provided with a first connecting hole, and an end portion of the handle is provided with a second connecting hole, and the first connecting hole is rotationally connected to the second connecting hole through the rotating shaft.

According to some embodiments of the present disclosure, when the grip of the handle is at the initial position, the convex portion is protruded to the outside of the bottom of the tray housing, and when the handle is at the raising position, the convex portion is retracted into the tray housing.

According to some embodiments of the present disclosure, the anti-falling elastic sheet is generally L-shaped, the mounting portion is disposed on an end portion of a bottom of an L-shaped anti-falling elastic sheet, the connecting portion is disposed on an end portion of a vertical part of the L-shaped anti-falling elastic sheet, and the convex portion is disposed at an outer side of the bottom of the L-shaped anti-falling elastic sheet.

In another aspect of the embodiment of the present disclosure, a chassis is further provided, which includes:
  a chassis body, wherein a bottom of the chassis body is provided with a groove; and
  a tray, wherein the tray includes:
  a tray housing;
  a handle assembly, wherein the handle assembly includes a fixing portion and a handle, the fixing portion is fixedly disposed at a bottom of the tray housing, and the handle and the fixing portion are connected through a rotating shaft; a side wall of the handle is provided with a grip convex column, and the grip convex column is disposed between the rotating shaft and a grip of the handle; and
  an anti-falling elastic sheet, wherein the anti-falling elastic sheet includes a mounting portion, a convex portion and a connecting portion, the mounting portion is fixedly mounted with the bottom of the tray housing, the convex portion is protruded to an outside of the bottom of the tray housing through an opening of the tray housing; when the tray is at a mounting position, the convex portion is protruded into the groove and the connecting portion is connected to the grip convex column of the handle assembly; wherein when the grip of the handle is rotated from an initial position to a raising position, the grip convex column applies an upward force to the connecting portion to make the convex portion of the anti-falling elastic sheet move upwards and then be detached from the groove.

According to an embodiment of the present disclosure, the mounting portion is disposed at one end of the anti-falling elastic sheet, and the connecting portion is disposed at the other end of the anti-falling elastic sheet opposite to the mounting portion, the mounting portion is fixedly connected to the bottom of the tray housing through a screw, the connecting portion is disposed in a hook shape, and the connecting portion is hooked to the grip convex column.

According to an embodiment of the present disclosure, the fixing portion is disposed as a riveting column, the fixing portion is riveted with the bottom of the tray housing through a rivet, and an upper portion of the fixing portion is provided with a first connecting hole, and an end portion of the handle is provided with a second connecting hole, and the first connecting hole is rotationally connected to the second connecting hole through the rotating shaft.

According to an embodiment of the present disclosure, when the grip of the handle is at the initial position, the convex portion is protruded to the outside of the bottom of the tray housing, and when the grip of the handle is at the raising position, the convex portion is retracted into the tray housing.

According to an embodiment of the present disclosure, the anti-falling elastic sheet is generally L-shaped, the mounting portion is disposed on an end portion of a bottom of an L-shaped anti-falling elastic sheet, the connecting portion is disposed on an end portion of a vertical part of the L-shaped anti-falling elastic sheet, and the convex portion is disposed at an outer side of the bottom of the L-shaped anti-falling elastic sheet.

BRIEF DESCRIPTION OF THE DRAWINGS

In order to more clearly illustrate the technical solutions of the embodiments of the present application or the related art, the figures that might be involved in the embodiments or the relevant description will be briefly described below. Apparently, the figures that are described below merely involve some embodiments of the present application, and a person skilled in the art may obtain other embodiments according to these figures without paying creative work.

DETAILED DESCRIPTION

Embodiments of the present disclosure are described below. However, it should be understood that the disclosed embodiments are only examples, and other embodiments may take various alternative forms. The drawings are not necessarily drawn in proportion. Some of functions may be exaggerated or minimized to show details of specific components. Therefore, specific structural and functional details disclosed herein should not be interpreted to be limiting, but merely as a representative basis for teaching those skilled in the art to use the present disclosure in various ways. As may be appreciated by those skilled in the art, various features shown and described with reference to any one of the drawings may be combined with features shown in one or more other drawings to produce embodiments not explicitly shown or described. Combination of features shown provides representative embodiments for typical applications. However, various combinations and modifications of features consistent with teachings of the present disclosure may be desirable for certain specific applications or implementations.

Figure 1:
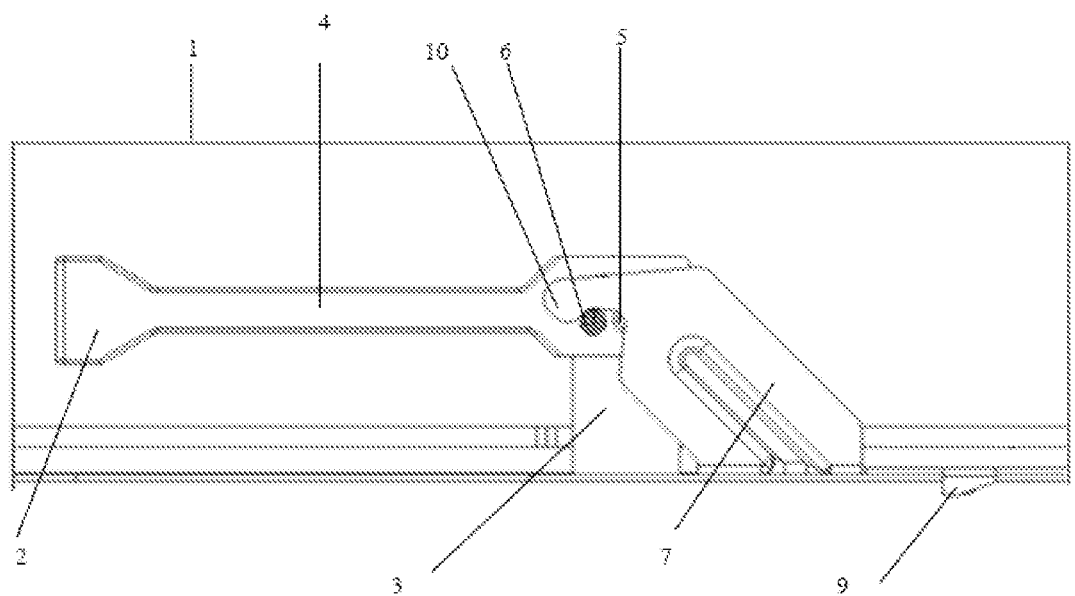
FIG. 1 is a schematic diagram of a tray in a chassis according to an embodiment of the present disclosure.

Based on the above object, in a first aspect of an embodiment of the present disclosure, an embodiment of a tray in a chassis is provided. FIG. 1 shows a schematic diagram of the tray.

As shown in FIG. 1, the tray may include a tray housing 1 and a handle assembly 2.

The handle assembly 2 includes a fixing portion 3 and a handle 4. The fixing portion 3 is fixedly disposed at a bottom of the tray housing 1, and the handle 4 and the fixing portion 3 are connected through a rotating shaft 5, a side wall of the handle 4 is provided with a grip convex column 6, and the grip convex column 6 is disposed between the rotating shaft 5 and a grip of the handle 4.

In some embodiments, the fixing portion 3 is disposed as a riveting column, the fixing portion 3 is riveted with the bottom of the tray housing 1 through a rivet. An upper portion of the fixing portion 3 is provided with a first connecting hole. An end portion of the handle 4 is provided with a second connecting hole. During installation, the first connecting hole and the second connecting hole are aligned and then connected through the rotating shaft 5, and thus the handle 4 and the fixing portion 3 may rotate through the rotating shaft 5.

In some embodiments, the fixing portion 3 is provided with a stopping block and the stopping block defines a rotation angle of the handle 4 through the rotation shaft 5.

Figure 2:
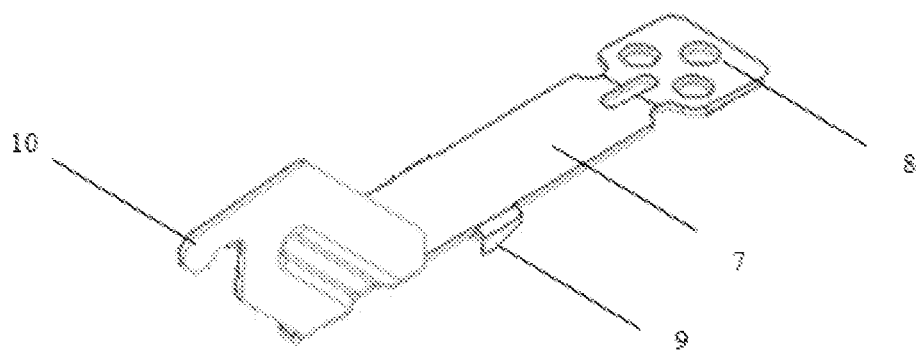
FIG. 2 is a schematic diagram of an anti-falling elastic sheet according to an embodiment of the present disclosure.

As shown in FIG. 2, the tray may further include an anti-falling elastic sheet 7. The anti-falling elastic sheet 7 includes a mounting portion 8, a convex portion 9 and a connecting portion 10. The mounting portion 8 is fixedly mounted with the bottom of the tray housing 1, the convex portion 9 is protruded to an outside of the bottom of the tray housing 1 through an opening of the tray housing 1. The connecting portion 10 is connected to the grip convex column 6 of the handle assembly 2. The grip of the handle 4 may include an initial position and a raising position, and the grip of the handle 4 may move between the initial position and the raising position. The initial position is a state in which the handle falls down after the tray is mounted to the chassis, and the raising position is an upright state in which the grip is rotated about 90 degrees from the initial state. When the grip of the handle 4 is rotated from the initial position to the raising position, the grip convex column 6 applies an upward force to the connecting portion 10 to make the anti-falling elastic sheet 7 move upwards.

In some embodiments, the anti-falling elastic sheet 7 may produce a certain amount of deformation. The mounting portion 8 is disposed at one end of the anti-falling elastic sheet 7 in a longitudinal direction, and the connecting portion 10 is disposed at the other end of the anti-falling elastic sheet 7 opposite to the mounting portion 8 in the longitudinal direction. The mounting portion 8 is fixedly connected to the bottom of the tray housing 1 through a screw. When the handle 4 is rotated, under the upward force applied by the grip convex column 6, the anti-falling elastic sheet 7 at a side of the connecting portion 10 connected to the grip convex column 6 is driven to move upwards. Since the mounting portion 8 and the connecting portion 10 are disposed on two opposite end portions of the anti-falling elastic sheet, and the convex portion 9 disposed at the bottom of the anti-falling elastic sheet 7 is disposed at a side close to the connecting portion 10, thus the convex portion 9 may also move upwards.

In some embodiments, the connecting portion 10 may be disposed in a hook shape, and the connecting portion 10 is hooked to the grip convex column 6.

In some embodiments, the anti-falling elastic sheet 7 is generally L-shaped, the mounting portion 8 is disposed on an end portion of a bottom of an L-shaped anti-falling elastic sheet 7, the connecting portion 10 is disposed on an end portion of a vertical part of the L-shaped anti-falling elastic sheet 7, and the convex portion 9 is disposed at an outer side of the bottom of the L-shaped anti-falling elastic sheet 7.

In some embodiments, the connecting portion 10 may has a ring shape, and the ring-shaped connecting portion 10 is sleeved on the grip convex column 6.

In some embodiments, when the grip of the handle 4 is at the initial position, the convex portion 9 is protruded to the outside of the bottom of the tray housing 1, and when the grip of the handle 4 is at the raising position, the convex portion 9 is retracted into the tray housing 1. The initial position is a state in which the grip falls down after the tray is mounted to the chassis, and the raising position is an upright state in which the grip is rotated about 90 degrees from the initial state.

By using the technical solution of the present disclosure, the tray may be prevented from being damaged due to wrong operations of a user, and the tray may be prevented from accidentally falling off.

In an embodiment of the present disclosure, the mounting portion 8 is disposed at one end of the anti-falling elastic sheet 7, and the connecting portion 10 is disposed at the other end of the anti-falling elastic sheet 7 opposite to the mounting portion 8, the mounting portion 8 is fixedly connected to the bottom of the tray housing 1 through a screw, the connecting portion 10 is disposed in a hook shape, and the connecting portion 10 is hooked to the grip convex column 6. The hook-shaped connecting portion 10 is designed so that it is ensured that the hook-shaped connecting portion 10 is always hooked to the grip convex column 6 during the rotating process from the initial position of the handle to the raising position.

In an embodiment of the present disclosure, the fixing portion 3 is disposed as a riveting column, the fixing portion 3 is riveted with the bottom of the tray housing 1 through a rivet, and an upper portion of the fixing portion 3 is provided with a first connecting hole, and an end portion of the handle 4 is provided with a second connecting hole, and the first connecting hole is rotationally connected to the second connecting hole through the rotating shaft 5. During installation, the first connecting hole and the second connecting hole are aligned and then connected through the rotating shaft 5, and thus the handle 4 and the fixing portion 3 may be rotated through the rotating shaft 5.

Figure 3:
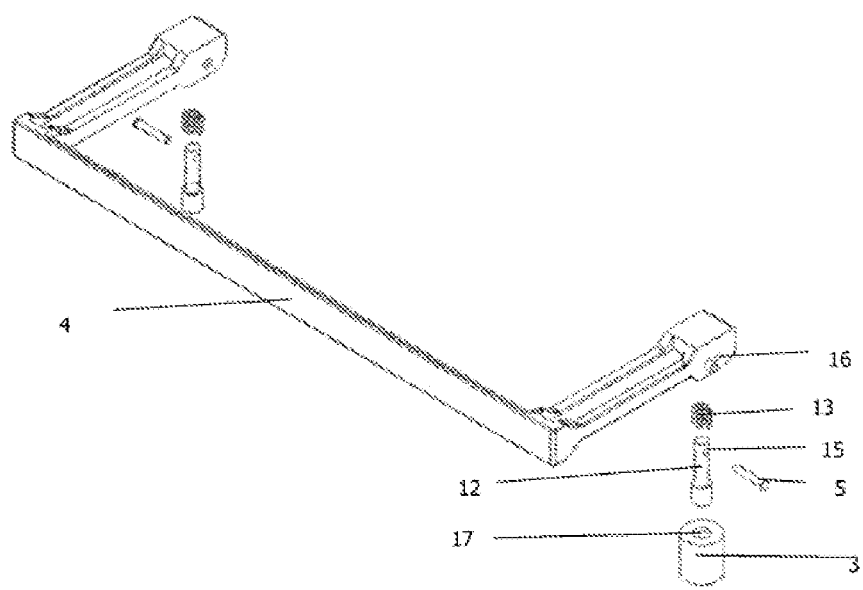
FIG. 3 is a schematic diagram of a handle assembly according to an embodiment of the present disclosure.

As shown in FIG. 3, in some embodiments, the fixing portion 3 is disposed as a riveting column. The fixing portion 3 may further include a connecting shaft 12, a spring 13 and the rotating shaft 5. An upper end of the connecting shaft 12 includes a third connecting hole 15. An end portion of the handle 4 is provided with a fourth connecting hole 16. A bottom of the end portion of the handle 4 is provided with an insertion hole. The riveting column is a cylinder, a connecting groove 17 is disposed at a middle portion of the cylinder, and a lower end of the connecting shaft is mounted in the connecting groove 17. The spring 13 is sleeved on the upper end of the connecting shaft 12, so that the spring 13 is located between the connecting shaft 12 and the third connecting hole 15. After the connecting shaft 12 is inserted into the insertion hole at the bottom of the end portion of the handle 4, so that the third connecting hole 15 and the fourth connecting hole 16 are aligned, the riveting column is connected to the handle 4 through the rotating shaft 5.

In an embodiment of the present disclosure, when the grip of the handle 4 is at the initial position, the convex portion 9 is protruded to the outside of the bottom of the tray housing 1, and when the grip of the handle 4 is at the raising position, the convex portion 9 is retracted into the tray housing 1. The initial position is a state in which the grip falls down after the tray is mounted to the chassis, and the raising position is an upright state in which the grip is rotated about 90 degrees from the initial state.

In an embodiment of the present disclosure, the anti-falling elastic sheet 7 is generally L-shaped, the mounting portion 8 is disposed on an end portion of the bottom of the L-shaped anti-falling elastic sheet 7, and the connecting portion 10 is disposed on an end portion of a vertical part of the L-shaped anti-falling elastic sheet 7. The convex portion 9 is disposed at an outer side of the bottom of the L-shaped anti-falling elastic sheet 7.

By using the technical solution of the present disclosure, the tray may be prevented from being damaged due to wrong operations of a user, and the tray may be prevented from accidentally falling off.

Figure 4:
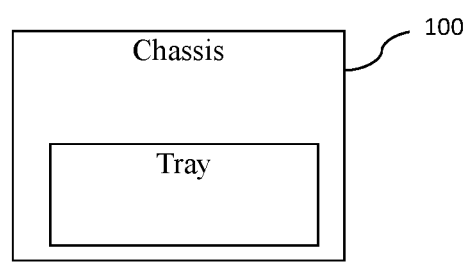
FIG. 4 is a schematic diagram of a chassis according to an embodiment of the present disclosure.

Based on the above object, in a second aspect of the embodiment of the present disclosure, a chassis 100 is provided. As shown in FIG. 4, the chassis 100 includes: a chassis body, and a tray, wherein a bottom of the chassis body is provided with a groove. The Tray includes a tray housing, a handle assembly and an anti-falling elastic sheet. The handle assembly includes a fixing portion and a handle. The fixing portion is fixedly disposed at a bottom of the tray housing. The handle and the fixing portion are connected through a rotating shaft. A side wall of the handle is provided with a grip convex column, and the grip convex column is disposed between the rotating shaft and a grip of the handle.

The anti-falling elastic sheet includes a mounting portion, a convex portion and a connecting portion. The mounting portion is fixedly mounted with the bottom of the tray housing. The convex portion is protruded to an outside of the bottom of the tray housing through an opening of the tray housing. When the tray is at a mounting position, the convex portion is protruded into the groove and the connecting portion is connected to the grip convex column of the handle assembly. The grip of the handle may include an initial position and a raising position, and the grip of the handle may move between the initial position and the raising position. The initial position is a state in which the grip of the handle falls down after the tray is mounted to the chassis, and the raising position is an upright state in which the grip is rotated about 90 degrees from the initial state. When the grip of the handle is rotated from an initial position to a raising position, the grip convex column applies an upward force to the connecting portion to make the convex portion of the anti-falling elastic sheet move upwards and then be detached from the groove.

In an embodiment of the present disclosure, the mounting portion is disposed at one end of the anti-falling elastic sheet, and the connecting portion is disposed at the other end of the anti-falling elastic sheet opposite to the mounting portion, the mounting portion is fixedly connected to the bottom of the tray housing through a screw, the connecting portion is disposed in a hook shape, and the connecting portion is hooked to the grip convex column.

In an embodiment of the present disclosure, the fixing portion is disposed as a riveting column, the fixing portion is riveted with the bottom of the tray housing through a rivet, and an upper portion of the fixing portion is provided with a first connecting hole, and an end portion of the handle is provided with a second connecting hole, and the first connecting hole is rotationally connected to the second connecting hole through the rotating shaft.

In an embodiment of the present disclosure, when the grip of the handle is at the initial position, the convex portion is protruded to the outside of the bottom of the tray housing, and when the handle is at the raising position, the convex portion is retracted into the tray housing.

In an embodiment of the present disclosure, the anti-falling elastic sheet is generally L-shaped, the mounting portion is disposed on an end portion of the bottom of the L-shaped anti-falling elastic sheet, the connecting portion is disposed on an end portion of a vertical part of the L-shaped anti-falling elastic sheet, and the convex portion is disposed at an outer side of the bottom of the L-shaped anti-falling elastic sheet.

For the tray in the chassis according to the embodiment of the present disclosure, by using the solution of disposing a tray housing; a handle assembly, wherein the handle assembly includes a fixing portion and a handle, the fixing portion is fixedly disposed at a bottom of the tray housing, and the handle and the fixing portion are connected through a rotating shaft; a side wall of the handle is provided with a grip convex column, and the grip convex column is disposed between the rotating shaft and a grip of the handle; and an anti-falling elastic sheet, wherein the anti-falling elastic sheet includes a mounting portion, a convex portion and a connecting portion, the mounting portion is fixedly mounted with the bottom of the tray housing, the convex portion is protruded to an outside of the bottom of the tray housing through an opening of the tray housing, and the connecting portion is connected to the grip convex column of the handle assembly; wherein when the grip of the handle is rotated from an initial position to a raising position, the grip convex column applies an upward force to the connecting portion to make the anti-falling elastic sheet move upwards, the tray may be prevented from being damaged due to wrong operations of a user, and the tray may be prevented from accidentally falling off.

Although embodiments of the present disclosure have been shown and described, it will be understood by those skilled in the art that various changes, modifications, substitutions and variations may be made to these embodiments without departing from the principles and spirit of the present disclosure, and the scope of the present disclosure is defined by the appended claims and equivalents thereof.

The above embodiments are possible examples of implementation, and are only put forward for clear understanding of the principle of the present disclosure. Many changes and modifications may be made to the above embodiments without departing from the spirit and principles of technologies described herein. All modifications are intended to be included within the scope of this disclosure and protected by the appended claims.

The invention claimed is:

1. A tray in a chassis, comprising: a tray housing; a handle assembly, wherein the handle assembly comprises a fixing portion and a handle, the fixing portion is fixedly disposed at a bottom of the tray housing, and the handle and the fixing portion are connected through a rotating shaft; a side wall of the handle is provided with a grip convex column, and the grip convex column is disposed between the rotating shaft and a grip of the handle; and an anti-falling elastic sheet, wherein the anti-falling elastic sheet comprises a mounting portion, a convex portion and a connecting portion, the mounting portion is fixedly mounted with the bottom of the tray housing, the convex portion is protruded to an outside of the bottom of the tray housing through an opening of the tray housing, and the connecting portion is connected to the grip convex column; wherein when the grip is rotated from an initial position to a raising position, the grip convex column applies an upward force to the connecting portion to make the anti-falling elastic sheet move upwards; and the anti-falling elastic sheet is L-shaped, the mounting portion is disposed on an end portion of a bottom of an L-shaped anti-falling elastic sheet, the connecting portion is disposed on an end portion of a vertical part of the L-shaped anti-falling elastic sheet, and the convex portion is disposed at an outer side of the bottom of the L-shaped anti-falling elastic sheet.

2. The tray according to claim 1, wherein the mounting portion is disposed at one end of the anti-falling elastic sheet, and the connecting portion is disposed at the other end of the anti-falling elastic sheet opposite to the mounting portion, the mounting portion is fixedly connected to the bottom of the tray housing through a screw, the connecting portion is disposed in a hook shape, and the connecting portion is hooked to the grip convex column.

3. The tray according to claim 1, wherein the fixing portion is disposed as a riveting column, the fixing portion is riveted with the bottom of the tray housing through a rivet, and an upper portion of the fixing portion is provided with a first connecting hole, and an end portion of the handle is provided with a second connecting hole, and the first connecting hole is rotationally connected to the second connecting hole through the rotating shaft.

4. The tray according to claim 1, wherein when the grip is at the initial position, the convex portion is protruded to the outside of the bottom of the tray housing, and when the grip is at the raising position, the convex portion is retracted into the tray housing.

5. A chassis, comprising: a chassis body, wherein a bottom of the chassis body is provided with a groove; and a tray, wherein the tray comprises: a tray housing; a handle assembly, wherein the handle assembly comprises a fixing portion and a handle, the fixing portion is fixedly disposed at a bottom of the tray housing, and the handle and the fixing portion are connected through a rotating shaft; a side wall of the handle is provided with a grip convex column, and the grip convex column is disposed between the rotating shaft and a grip of the handle; and an anti-falling elastic sheet, wherein the anti-falling elastic sheet comprises a mounting portion, a convex portion and a connecting portion, the mounting portion is fixedly mounted with the bottom of the tray housing, the convex portion is protruded to an outside of the bottom of the tray housing through an opening of the tray housing; when the tray is at a mounting position, the convex portion is protruded into the groove and the connecting portion is connected to the grip convex column of the handle assembly; wherein when the grip is rotated from an initial position to a raising position, the grip convex column applies an upward force to the connecting portion to make the convex portion of the anti-falling elastic sheet move upwards and then be detached from the groove; and the fixing portion further comprise a connecting shaft and a spring, wherein the spring is sleeved on an upper end of the connecting shaft.

6. The chassis according to claim 5, wherein the mounting portion is disposed at one end of the anti-falling elastic sheet, and the connecting portion is disposed at the other end of the anti-falling elastic sheet opposite to the mounting portion, the mounting portion is fixedly connected to the bottom of the tray housing through a screw, the connecting portion is disposed in a hook shape, and the connecting portion is hooked to the grip convex column.

7. The chassis according to claim 5, wherein the fixing portion is disposed as a riveting column, the fixing portion is riveted with the bottom of the tray housing through a rivet, and an upper portion of the fixing portion is provided with a first connecting hole, and an end portion of the handle is provided with a second connecting hole, and the first connecting hole is rotationally connected to the second connecting hole through the rotating shaft.

8. The chassis according to claim 5, wherein when the grip of the handle is at the initial position, the convex portion is protruded to the outside of the bottom of the tray housing, and when the grip of the handle is at the raising position, the convex portion is retracted into the tray housing.

9. The chassis according to claim 5, wherein the anti-falling elastic sheet is L-shaped, the mounting portion is disposed on an end portion of a bottom of an L-shaped anti-falling elastic sheet, the connecting portion is disposed on an end portion of a vertical part of the L-shaped anti-falling elastic sheet, and the convex portion is disposed at an outer side of the bottom of the L-shaped anti-falling elastic sheet.

10. The tray according to claim 1, wherein the fixing portion is provided with a stopping block, wherein the stopping block defines a rotation angle of the handle through the rotation shaft.

11. The tray according to claim 1, wherein the initial position is a state in which the handle falls down after the tray is mounted to the chassis; and the raising position is an upright state in which the grip is rotated 90 degrees from the initial state.

12. The tray according to claim 1, wherein the connecting portion has a ring shape, wherein the connecting portion is sleeved on the grip convex column.

13. The tray according to claim 1, wherein the fixing portion further comprises a connecting shaft and a spring, the spring is sleeved on an upper end of the connecting shaft.

14. The tray according to claim 13, wherein the upper end of the connecting shaft has a third connecting hole; an end portion of the handle is provided with a fourth connecting hole; and a bottom of the end portion of the handle is provided with an insertion hole; after the connecting shaft is inserted into the insertion hole, the third connecting hole and the fourth connecting hole are aligned.

15. The chassis according to claim 5, wherein the fixing portion is provided with a stopping block, wherein the stopping block defines a rotation angle of the handle through the rotation shaft.

16. The chassis according to claim 5, wherein the initial position is a state in which the handle falls down after the tray is mounted to the chassis; and the raising position is an upright state in which the grip is rotated about 90 degrees from the initial state.

17. The chassis according to claim 5, wherein the connecting portion is disposed in a ring shape, wherein the ring-shaped connecting portion is sleeved on the grip convex column.

18. The chassis according to claim 5, wherein the upper end of the connecting shaft has a third connecting hole; an end portion of the handle is provided with a fourth connecting hole; and a bottom of the end portion of the handle is provided with an insertion hole; after the connecting shaft is inserted into the insertion hole, the third connecting hole and the fourth connecting hole are aligned.

\* \* \* \* \*